United States Patent [19]
Brischke

[11] Patent Number: 5,215,467
[45] Date of Patent: Jun. 1, 1993

[54] MATHEMATICAL INSTRUCTION BOARD AND METHOD OF USE

[76] Inventor: Donald A. Brischke, P.O. Box 920074, Snowbird, Utah 84092

[21] Appl. No.: 825,914

[22] Filed: Jan. 27, 1992

[51] Int. Cl.⁵ .............................................. G09B 23/04
[52] U.S. Cl. .................................... 434/214; 434/211; 434/216
[58] Field of Search ............... 434/214, 211, 216, 188, 434/83, 407, 200, 408

[56] References Cited

U.S. PATENT DOCUMENTS

| | | | |
|---|---|---|---|
| 3,191,318 | 6/1965 | Hoffmann | 434/211 |
| 3,382,591 | 5/1968 | Savin et al. | 434/214 |
| 3,461,573 | 8/1969 | Stibal | 434/211 X |
| 3,702,505 | 11/1972 | Hadjigeorghiou | 434/214 |
| 3,797,134 | 3/1974 | Wingerd | 434/216 |

Primary Examiner—John J. Wilson
Assistant Examiner—Jeffrey A. Smith
Attorney, Agent, or Firm—Trask, Britt & Rossa

[57] ABSTRACT

An educational board for use in demonstrating mathematical principles has a surface marked with a circle having its circumference marked with gradations indicating 360 degrees. The board is provided with pins to mark any angular displacement along the circumference and connecting elastic bands which are stretched around the pins to create shapes inscribed in the circle.

21 Claims, 3 Drawing Sheets

MATHEMATICAL INSTRUCTION BOARD AND METHOD OF USE

BACKGROUND OF THE INVENTION

1. Field

This invention relates to instructional material for physically demonstrating concepts of mathematics. More particularly, the invention is an apparatus adapted for aiding students to visualize geometric and trigonometric shapes and the angular relationships therebetween.

2. State of the Art

The use of toys, games and visual aids to teach students has long been recognized as a beneficial means to draw interest and as a memory device to help students retain abstract concepts. Likewise, any method or apparatus which is enjoyable for a student tends to motivate during a student's own study or practice time. Visualization contributes to improved retention of abstract principles. A clear explanation is very difficult to achieve with mere words when discussing mathematical principles and geometric relationships. Nevertheless, diagrams and figures drawn by a teacher on a board or presented in textbooks have only limited ability to attract interest and lack any interaction with the student to investigate and discover the operation of the principles presented. Numerous inventions have been developed which allow a student to experiment, or a child to play, or a teacher to drill. Many of the devices which are available to teach geometric and mathematical principles are limited in their ability to teach general principles. No device in the cited art addressed the more sophisticated concepts equivalent to high school mathematical course work.

Geometric shapes known within the toy art. For example, U.S. Pat. No. 4,183,167 (Jatich, issued Jan. 15, 1980) shows a board having rows of pegs on which geometric shapes of triangles, squares, circles or hexagons can be placed to make a variety of designs and to intermesh with each other. Similarly, U.S. Pat. No. 3,849,912 (Kemnitzer, issued Nov. 26, 1974) discloses an educational toy having a board provided with rows of vertical pegs on which a variety of circular, triangular and rectangular shapes can be fit and stacked. U.S. Pat. No. 3,766,667 (Glassman, issued Oct. 23, 1973) describes a system of dowels and blocks which can be stacked to demonstrate the equivalence of additive values between blocks marked according to relative length. U.S. Pat. No. 3,302,311 (Israel, issued Feb. 7, 1967) describes vertical dowels on a base to receive square cubes marked with patterns on their outer surfaces so as to create a variety of patterns depending upon the location and orientation of each of the blocks. Triangular blocks are disclosed as well. U.S. Pat. No. 2,611,193 (Davis, issued Sep. 23, 1952) describes a circular base plate for an "arithmetic fraction trainer," having numerous vertical pegs on which sectors of a circle can be placed to show how fractions such as two halves, three thirds, four quarters, etc. add to make a whole circle. A design-forming toy is disclosed in U.S. Pat. 2,759,295 (Keuls, issued Aug. 21, 1956) having a base plate containing a grid of apertures into which a multiplicity of shapes can be inserted by means of a central post on each shape.

A variety of shaped building block toys and mosaic inlay systems have also resulted from the educational model, game and toy art. One of the earliest is U.S. Pat. No. 510,178 (Konig, issued Dec. 5, 1893) comprising a base board having conical depressions on an even grid spacing, which depressions each may receive a mosaic piece shaped to fit complementarily therein to form a mosaic surface pattern. The edges of colored mosaic pieces fit snugly to form the top visible surfaces. U.S. Pat. No. 3,487,579 (Brettingen, issued Jan. 6, 1970) describes interlocking blocks of hexagonal shape having hexagonal pegs on one side thereof and recesses in the opposing side thereof such that the blocks can be stacked one on top of another and at various angles with respect to each other to form a variety of designs. U.S. Pat. No. 3,570,170 (Kishi, issued Mar. 16, 1971) describes a rectangular block having pegs of circular cross section on one side thereof, the opposing side containing recesses to receive the pegs, thus promoting an ability to stack the blocks snugly together at a variety of translational locations and at 90° orientations within the plane of the surfaces containing the pegs and recesses.

U.S. Pat. No. 3,579,859 (Malenge, issued May 25, 1971) discloses an educational game in which the user arranges a number of colored shapes on a plane to obtain figures and patterns by placing round elements, or cylindrical elements, or rectangular elements on a variety of grid locations to create a mosaic-like effect. Also, the invention describes various designs which can be made by revealing different colored sheets through grid openings overlying them. U.S. Pat. No. 3,748,752 (Quercetti, issued Jul. 31, 1973) discloses a mosaic block which can be interlocked with other identical mosaic blocks to make a surface, or a pattern, or a figure.

U.S. Pat. No. 4,051,621 (Hogan, issued Oct. 4, 1977) discloses a set containing a variety of "homohedral" modules which have pegs and openings at their vertices which can fit together to construct more elaborate structures.

All the foregoing toys, games and models rely on numerous manufactured pieces of regular shape and of considerable bulk to demonstrate a limited number of shapes and relations. Likewise, each of the shapes used is limited in its ability to teach the underlying principles of mathematics which relate to shapes, lines, angles and other interrelationships.

Thus, the aids, toys, and games in the art restrict a teacher or a student to the limited choice of manufactured shapes that are available with the device. Likewise, little experimentation is available, and no capability to extend understanding to more complex or generalized principles such as those encountered in a math class, particularly at a junior high or high school level.

SUMMARY OF THE INVENTION

A mathematical instruction board is disclosed having a surface for supporting and displaying geometric and trigonometric shapes and relationships. The surface is marked with orthogonal cartesian axes with their intersecting origin acting as the center point for a circle, marked by gradation points at each degree of angular displacement along its circumference. Pins for marking gradation points can be inserted along the circumference and elsewhere on the board and connected by elastic bands as connectors to visually demonstrate lines, angles, shapes and their relationships.

The present invention overcomes the limitations of the prior art by providing no pre-manufactured, bulky shapes but rather providing means for marking points on and within a circle, and means for connecting those points to describe polygons and angles. Instead of limited numbers of shapes, the entire range of polygons can be created, encouraging students to hypothesize and experiment with the patterns relating angles to numbers of sides and to fractions of a 360° circle subtended by those sides.

With the tools of geometry, including a straightedge and compass, the most complex principles of geometry can be repeatedly demonstrated and investigated until relationships become clear and memorable. Trigonometry's principles are demonstrable by forming angles and triangles with pins at vertices and physical lines such as elastic bands connecting the pins. Such visual definitions as tangents, perpendiculars, bisections, complements and supplements can be created by connecting pins set in numerous configurations until the definitions are meaningful and the relationships are clear.

Moreover, virtually any shape or relationship can be demonstrated repeatedly by an instructor and duplicated by a student. Students can do exercises or experiments to further investigate the behavior of shapes and angles.

A mathematical instruction board has a surface for displaying a circle permanently marked thereon. Principal axes are also marked on the surface with their point of intersection located at the center of the circle. The coordinate axes are oriented to the standard horizontal and vertical (X and Y) cartesian geometric axes. Pins, also called point markers, are provided in color-coded sets to mark points on the circumference of the circle and within it. Connectors are provided to interconnect point markers, pins secured on the surface. Marks are permanently applied to the circle indicating degrees. Labels indicate degrees of the marks. Pigments are applied to the surface indicating marks of principal points of the circle such as the four equidistant points at which the axes cross the circle, the five equidistant points forming the vertices of a pentagon circumscribed by the circle, the equidistant points forming the vertices of a triangle, a hexagon, an octagon, and so forth.

Preferably, the mathematical instruction board is a board having a writing surface applied thereto and capable of receiving the pins at every degree about the circumference of the circle marked thereon. In one embodiment, the pins, serving as point markers for vertices, may penetrate the board by virtue of the board material, and the marking of angles is accomplished by stretching an elastic band between the pins inserted into the board. In another embodiment, the board is constructed of a material capable of receiving markings from dry markers which are erasable. One very useful embodiment is a rollable polymer sheet which can be pinned to a bulletin board or similar surface and rolled up for storage. In yet another embodiment, the point marker pins are pegs received into holes in the surface of the mathematical instruction board, so that elastics may be stretched between the pins to demonstrate angular relationships, while labels and other lines may be drawn on the board surface at the same time. Yet another embodiment provides for inlaid material for the circumference of the circle and its axes, so as to receive conventional push pins while the remainder of the board is constructed of an erasable writing surface. Another embodiment uses magnetic markers attachable to a surface coated on an underlying plate of metal. The mathematical instruction board may include a straight edge for marking lines, one or more protractors of different sizes or design for measuring angles, and may include backing materials on the protractors and straight edges to hold them against the board, for example, magnet strips for attachment to a coated steel board.

A method of use is disclosed by which students are led to create their own ad hoc rules for mathematical relations such as in geometry and trigonometry, based on observed relationships discovered by them through exercises with the board.

A kit is described containing the desirable parts to conduct exercises and training with the mathematical instruction board.

BRIEF DESCRIPTION OF THE DRAWINGS

In the drawings, which illustrate what is presently regarded as the best mode embodiment.

DETAILED DESCRIPTION OF THE ILLUSTRATED EMBODIMENTS

Figure 1:
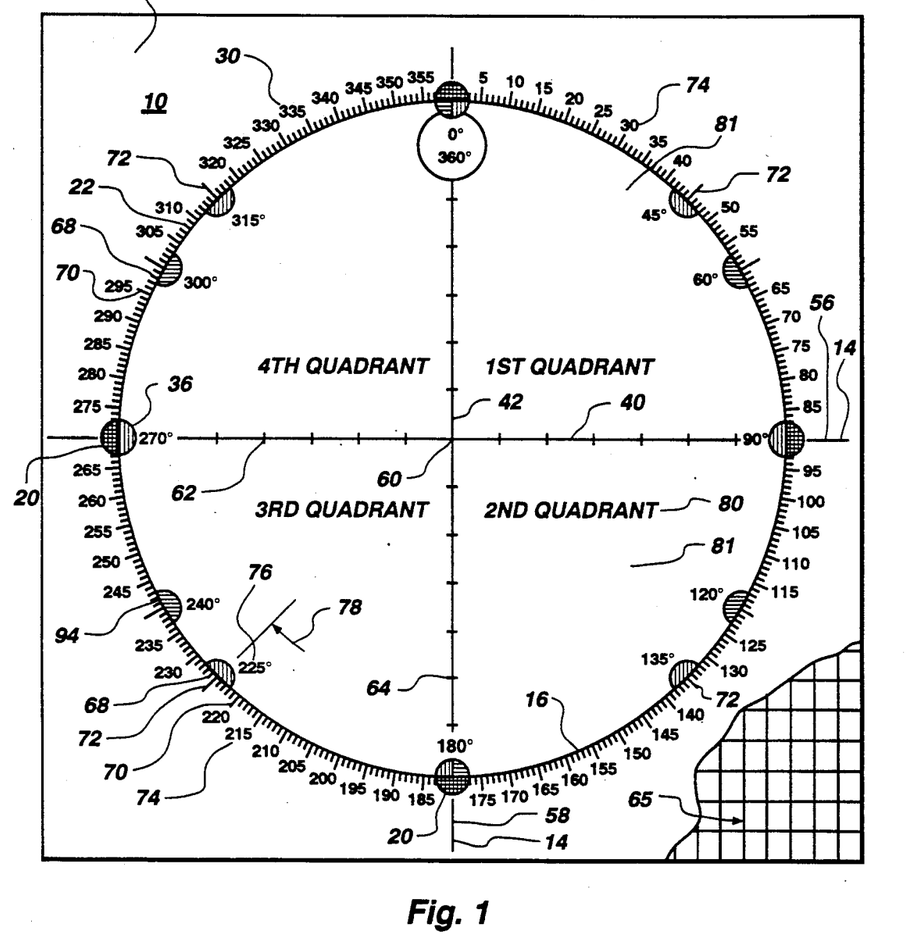
FIG. 1 is a plan view of a mathematical instruction board as it would appear on a desk or table.
Figure 2:
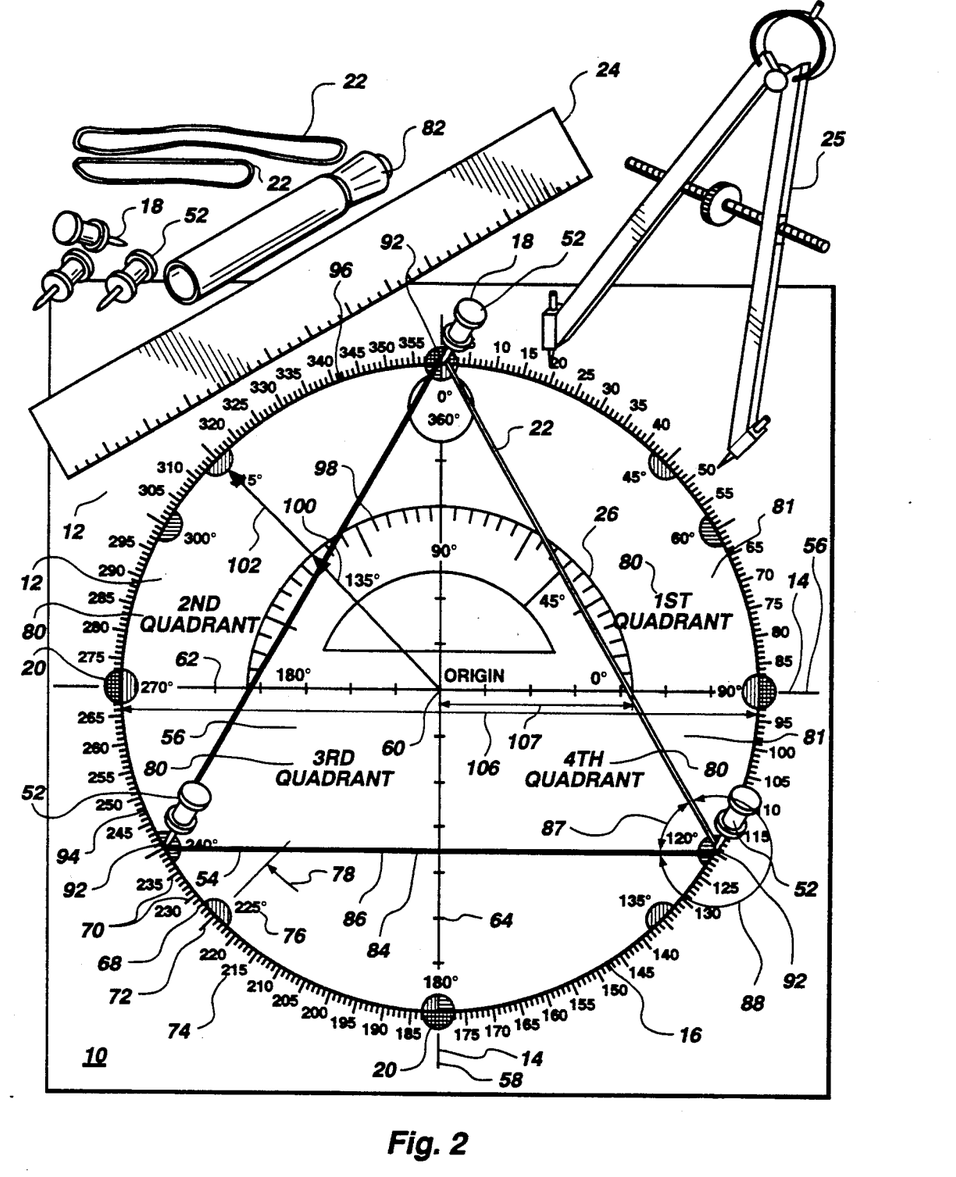
FIG. 2 shows the kit containing the mathematical instruction board, and the supporting equipment for instruction and exercises; the board is shown in plan view with pins inserted every 120° and elastic bands stretched between the pins to demonstrate an inscribed triangle.

FIGS. 1 and 2 show the mathematical instruction board, alternately the "board," with the board 10 in a kit in FIG. 2. The mathematical instruction board 10, as illustrated, may be referred to as a shape comparison board when used with younger children to make it relate better to their current understanding.

Figure 4:
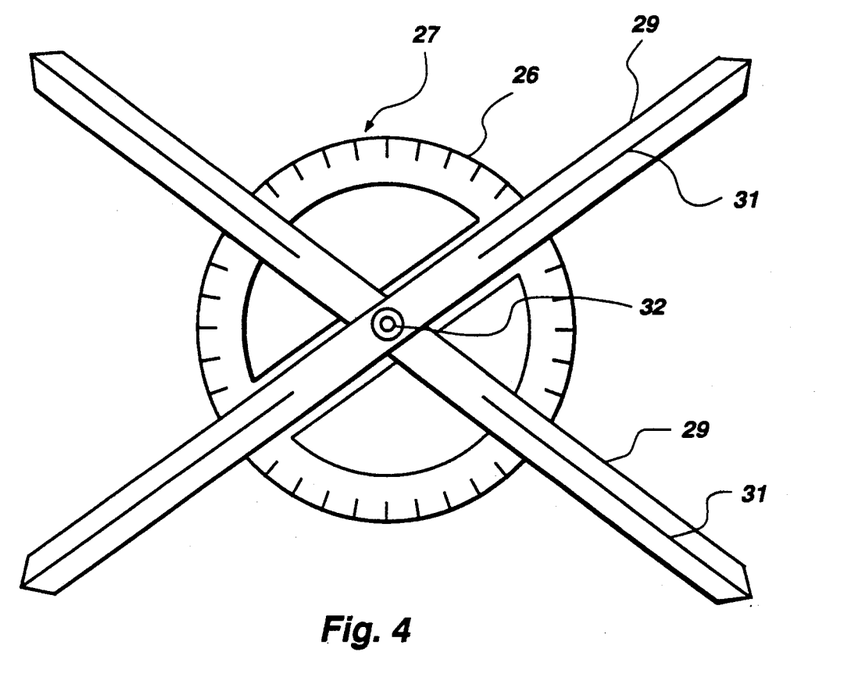
FIG. 4 is a plan view of a scissor protractor.
Figure 5:
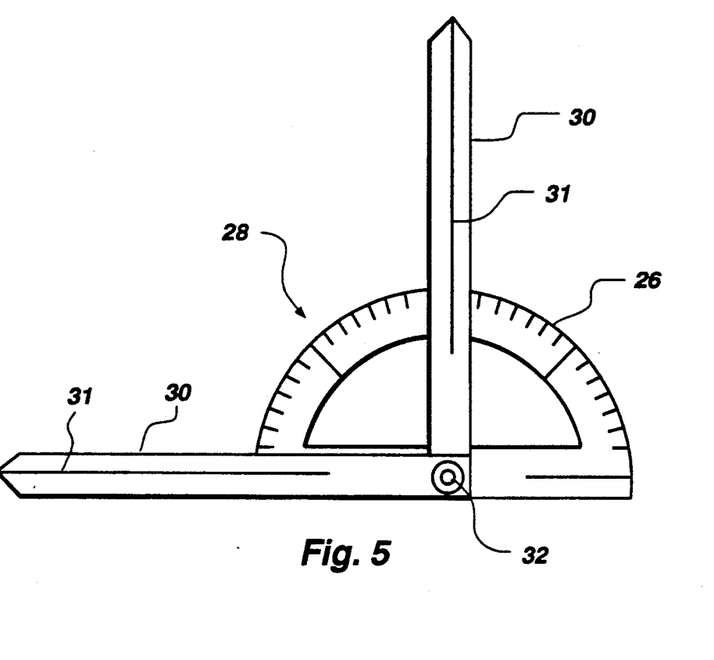
FIG. 5 is a plan view of a divider protractor.

The mathematical instruction board 10 is comprised of a surface 12 for writing and displaying lines, numbers, angles and other marks as desired by an instructor. The mathematical instruction board 18 is provided with cartesian axes 14 and a circle 16 marked on surface 12. The surface 12 is constructed to receive pins 18 to identify points thereon, and pigment marks 20 are marked on surface 12 to indicate points of interest on circle 16. Connectors 22 are placed to extend between pins 18 for marking lines therebetween and for creating shapes and angles. The mathematical instruction board 10 also includes a straight edge 24, compass 25, and protractors 26. As shown in FIGS. 4 and 5, the board also includes a scissor protractor 27 and a divider protractor 28. The scissor protractor 27 and divider protractor 28 each contain a conventional protractor 26 on which angle indicators 29 and 30 are pivotally connected to provide for measurements of angles by use of protractors 26. Preferably, the angle indicators 29 on scissor protractor 27 and the angle indicators 30 on divider protractor 28 are made of a clear material such that the protractors can be seen through the angle indicators 29, 30. The angle indicators 29 and 30 are provided with center lines 31 which pass through pivot points 32 to allow precise alignment of the angle indicators 29, 30 while using the scissor protractor 27 and divider protractor 28 for measuring angles.

The surface 12 is comprised of a top layer 42 and a backer 44 in the best mode embodiment. Top layer 42 may be constructed of a polymeric sheet. Polymeric film also serves as an alternate material. Plastic laminates such as "Formica ™" and erasable "white board" are particularly suitable embodiments.

Figure 3:
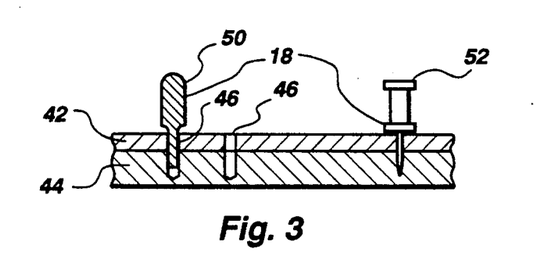
FIG. 3 shows a cross-section of the board showing a particularly suitable construction.

In FIG. 3, the cross-section of the best mode mathematical instruction board 10 is shown to further comprise a backer 44 which gives structural support to the top layer 42. The backer 44 may be made of wood, such as "Masonite ™," or from another stiff material. Likewise, the backer 44 might be made of a stiff but porous material, such as "Celote ™", which is capable of receiving conventional push pins, thumb tacks and other penetrations repeatedly without structural damage. The top layer 42 may be a hard material such as "white board" which is used to receive dry markers, or may be a heavy polyethylene which could be punctured repeatedly without loss of its structural integrity. Likewise, top layer 42 may also be drilled to form holes 46 if it is too hard for penetration by thumbtacks and so forth. Metal could serve as a backer 44 with a smooth coating of paint or porcelain. Magnetism for anchoring items to the top layer 42 exists between iron in the backer 44 and magnets in the objects placed thereon. Like school maps and charts, a roll-up style surface 12 is another embodiment, in which case top layer 42 is flexible plastic and backer 44 is paper. Other embodiments contemplated are printed paper, flexible rollable polymer sheets, injection molded plastic boards 10 or polymer foam boards 10 manufactured by fabrication or any of several molding processes.

As shown in FIG. 2, marking of points on the mathematical instruction board is done by placing pins 18 in the top layer 42. Pins 18, in FIG. 3, are pegs 50, but in FIG. 2 are shown as conventional push pins 52 in the best mode embodiment. For a hard top layer 42, FIG. 3 shows pegs 50 of dowel material or a molded shape fitted snugly into the holes 46 in the mathematical instruction board 10.

The suitable size for the mathematical instruction board 10 of FIGS. 1 and 2 is about 24 inches square. Such a size is suitable for display by an instructor to an individual or to a class. For teaching an entire classroom full of students, it may be preferable to have a size of at least 36 inches across, with a suitable vertical dimension for display in the front of a class. For an individual student, a mathematical instruction board for personal use measuring 14 inches or less on a side is contemplated as the best mode to practice the invention.

Push pins 52 may be used with any softer material as described above, to allow marking of any point on the surface 12 where the push pin 52 might be inserted. Where the word "pins" is used, any suitable marker which is capable of being attached to the surface 12 to mark a location may be suitable. Thus, although conventional push pins 52 such as are used in offices and classrooms represent the best embodiment of the invention as currently practiced, it is conceivable that with a change in circumstances, magnetic markers, or reusable, removable adhesive plastic, or pegs 50 fitted into holes 46 or some other attachment means might be best adapted to a particular presentation of the invention.

A principal function of the invention, visually demonstrating mathematical relationships, is accomplished by marking axes 14 and a circle 16 on the top layer 42 of the mathematical instruction board 10 of FIGS. 1 and 2. Numerous devices associated with circle 16 and axes 14 are used to readily identify and utilize points and angles on the invention.

The axes 14 are comprised of a horizontal axis 56 and a vertical axis 58 which intersect at the origin 60. The origin 60 is the center point of circle 16. The horizontal axis 56 has relative distance marks 62 along its length while the vertical axis 58 has vertical relative height marks 64 along its height. In one embodiment, a grid 65 is aligned with the axes 14 to facilitate working outside the circle 16. This is particularly valuable in dealing with trigonometric concepts.

The circle 16 is marked and labeled as shown in FIGS. 1 and 2 with degree gradations 68 and other marks which will next be explained.

A circle 16 is marked on the top layer 42 by some permanent means. That means may be permanent marker, paint, inlaid plastic, overlaid plastic, or another inlaid material capable of receiving the pins 18. Suitable materials may include rubber, polymeric foam such as polystyrene, polyurethane, cork and others.

The circle 16 has marked around its circumference the degree gradations 68, numbering 360, and distinct marks for every fifth mark as a five degree gradation 70 as well as principal angle marks 72 at various numerous locations around the circumference. The principal angle marks 72 indicate angles on the circle 16 which are commonly used such as a definition of right angles, quarters of a circle. They may be marked for any even fractions of a circle ($\frac{1}{2}$, $\frac{1}{4}$, $\frac{1}{8}$, etc.), corresponding to 0°, 180°; 0°, 90°, 270°; 0°, 120°, 240° and so forth.

The principal angle marks 72 are also used as the vertices of various shapes which can be inscribed inside or circumscribed outside the circle. Similarly, the principal angle marks 72 can be used as tangent points to draw lines tangent to the circle 16, and those tangent lines will form the sides of regular polygons circumscribed outside of the circle 16. To aid in quick identification of the value of any particular degree gradation 68, gradation labels 74 corresponding to principal angle marks identifying them are permanently marked on the top layer 42. The principal gradation labels 76 are put on the opposite side of the circumference of circle 16 from the gradation labels 74 to facilitate identification of the principal angles.

The principal angles 78 are simply those which can be used to inscribe or circumscribe regular polygons about the circle 16. Principal angles 78 may be considered 0° and even multiples of 30°, 45°, 60°, 90° and so forth. Likewise, principal angles 78 may conceivably include major bisections of angles such as the midpoint between 0° and 90°, also 45°, or the midpoint between 0° and 360°, 180°, or the exact division of 360° divided by 5, 72° and the vertices of a pentagon. The principal angles 78 are marked by an instructor for a student to locate relatively quickly to define and evaluate the characteristics of any basic polygonal shape.

In addition to the principal angle labels 76, pigment marks 20 are applied at several of the principal angles 78, to further highlight principles which are useful for the most basic polygons, including triangles, squares, hexagons, and octagons. The pigment marks may be applied by staining the top layer 42 in the vicinity of a principal angle mark 72, or may be applied to the vicinity of the principal angle label 76. Numerous means to identify these labels by color could also include printing the principal angle labels 76 in unique colors, or else applying, inlaying or molding the color under the principal angle label 76 in the top layer 42 in the vicinity of principal angle marks 72. Moreover, in the best mode of practicing of the device, the pigment marks 20 will be of a variety of colors, each color being coded to a specific set of principal angle marks 72 such that connecting all the pigment marks 20 of one color will result in an inscribed shape of a specific regular polygon. Similarly, drawing tangents at each of the principal angle marks 72 of a single color of pigment mark 20 will result in a circumscribed regular polygon outside the circle 16. As with other marking means, the pigment marks 20 might be applied with a paint underlayment before the circle 16 is marked, or may be an inlaid material in the top layer 42, or may be marked directly in the principal angle mark 72 or the principal angle label 76. All of the foregoing means of making pigment marks 20 are contemplated, but the preferred embodiment is a transparent colored circle or semi-circle with a principal angle mark 72 at its center.

The circle 16 is further marked by quadrant labels 80 to identify the progression from 0° to 360° around the circumference of circle 16 through each of the 90° quadrants 81 defined by the axes 14. It should be noted that the mathematical instruction board 10 can be arranged in either of two formats. One format is like a clock, with 0° and 360° at the topmost point on the circle 16. In this orientation, younger children can identify the progression through the angles around a circle 16 as they would the progress of the hands around a clock. Thus, for younger students, the mathematical instruction board 10 could be used in a manner which capitalizes on their understanding of a clock, hours of the day, and the progress of the hands around the clock in a clockwise direction. By the same token, an older student may prefer to display the circle 16 with its various markings in a conventional cartesian geometry position. That is, cartesian coordinates begin with 0° at the rightmost edge of a circle and angular displacement is measured counterclockwise from that 0° position. Thus, the mathematical instruction board 10 has a horizontal axis 56 and a vertical axis 58 which can be labeled with different principal angle marks 72.

For a younger child, the vertical axis 58 would be labeled as the 0° axis with all angles being measured clockwise therefrom, whereas for an older student, the horizontal axis 56 would be considered the 0° axis with all angular displacements measured counterclockwise therefrom.

In this same dichotomy, the first quadrant is always the first quadrant in either configuration, whereas the second quadrant, third quadrant and fourth quadrant progress in opposing directions between the two different configurations.

In addition to the mathematical instruction board 10 as described, several additional structures are helpful in the use of the mathematical instruction board. As shown in FIG. 2, those items include pins 18 for marking which are shown as push pins 52, but may be pegs 50 or other suitable marking devices including dry markers, magnetic markers and so forth. For magnetic markers, either the top layer 42 or the backer 44 of the mathematical instruction board 10 would need to be constructed of metal to provide a suitable attachment surface.

The mathematical instruction board 10 is further provided with connectors 22 to connect the points marked by the pins 18. Such connectors 22 might be elastic bands, as in the preferred embodiment, or strings, or even lines marked on the top layer 42 by means of magnetic strips or an erasable marking pen 82 and a straight edge 24 between consecutive pins 18.

For showing the independence of angular displacement from radius of a circle, a protractor 26 is provided as part of the mathematical instruction board 10. In the preferred embodiment, multiple protractors 26, as well as scissor protractor 27 and divider protractor 28, will be provided. Preferably one protractor 26 has a radius 104 approximately equal to the radius 100 of the circle 16, while another protractor 26 has a radius 104 of half the radius 100 of circle 16. Yet another tool, a scissor protractor 27 can be constructed from a pair of long, narrow, flat strips of suitable material, each strip having pointed ends and being rotatably attached at its mid-length center to the other strip to form angle indicators 29 and 30 (FIGS. 4 and 5). The scissors protractor 27 is particularly useful also for showing the principles of and relationships between complementary and supplementary angles if the scissor protractor 27 is laid against a polygonal side 84 of the polygon 86 created by connection of pins 18 with connectors 22 as shown in FIG. 2.

A compass 25 is also useful with the mathematical instruction board 10. With a compass 25, it is possible to demonstrate to advanced students the method of bisecting an angle using only a compass 25 and straight edge 24.

The mathematical instruction board 10 is provided as a kit having all the correct materials mentioned. The kit is boxed together, but alternate embodiments contemplated use the top surface of a molded box as the mathematical instruction board 10, with all other parts stored and available inside. Likewise the mathematical instruction board 10 may form the top surface of a wooden or fabricated storage container for the kit. The kit may be in the form of a cabinet with doors as in the form of an attache case (briefcase). Thus, an instructor has the mathematical instruction board 10 labeled as hereinbefore described in addition to color-coded push pins 52 corresponding to shapes such as triangles, squares, hexagons, octagons and pentagons. The pins 18 are coordinated by color with the pigment marks 20 corresponding to their principal angle marks 72. Thus, even a very young student can simply match up the pins 18 with their color-coded principal angle marks 72, put a connector 22 rubber band around all of the inserted pins 18 and immediately visualize the multi-sided polygon. Five pins 18 create a pentagon, three, a triangle, and so forth. The protractors 26, scissor protractor 27, and divider protractor 28 are used then to measure the angles of any polygon 86, interior angles 87 or exterior angles 88.

The instructor uses the mathematical instruction board 10 to present different concepts of shapes, angles and measures to a class. The student may also have his or her own version of the invention at the same time, or may use the teacher's to practice these concepts and demonstrate an understanding of them. Also, for larger groups, it may be better to have the invention created in a larger size and hung on a wall, or presented on an easel, or even rolled up like a retractable map, with a flexible, durable, erasable top layer 42, so that the mathematical instruction board can be put away during other instruction and deployed during instruction as required. The mathematical instruction board 10 of FIGS. 1 and 2 is presented lying flat on a desk. It may also be supported on an easel or displayed on a wall.

The method of use necessarily varies with the student, as do the exercises with the student's progress. Nevertheless, in the best mode embodiment, the method involves the definition of a circle as the points equidistant from a center, which principle is demonstrated by reference to the mathematical instruction board 10 with the circle 16 thereon and the other markings hereinbefore described. The circle then is divided into degrees, also demonstrated with the mathematical instruction board 10, and can be compared to a clock for younger students or to a map for older students. That is, younger students have a grasp of clocks and time and hours, whereas older students have seen maps and are aware of north, south, east and west as axes 14. Next, the student realizes that 0° and 360° (as well as 720° etc.) are the same point, and thus the circle 16 can be traversed more than once about its circumference 94, just as a rotating object makes more than a single revolution.

Progress through the various quadrants 81 of the circle 16 is next discussed showing angular displacement through each 90° quadrant 81.

Students next use a protractor and compass to measure divisions around the circumference 94 and to show the relationship between arc 96 and angle 98, as measured between two radii 100, 102. At this point, the student is shown that the angle 98 remains the same, independent of the diameter 106 or radius 100 of a circle.

Next, the instructor demonstrates for the student what the definition of radius 100, diameter 106, circumference 96 and so forth are, having experienced and visualized the relationships between them on the circle 16, protractor 26, scissor protractor 27 and divider protractor 28.

Finally, in the initial method of use, the student is told what the definitions are for right angle, straight line (straight angle), and so forth as the student recognizes them on the mathematical instruction board 10. That is, at this point the student has already begun to see relationships between angles 98 and the circle 16, and is now told what the names of those relationships and angles 98 are.

The relationships between angles, in general such as interior angle 87 and exterior angle 88, polygons such as the polygon 86 shown in FIG. 2, and circles such as circle 16, are next approached. The student is asked to find points marked with a specific color and to insert color-coded pins 18 at those pigment marks 20 of a specific color. Thus, the student has picked out the principal angle marks 72 of a specific polygon 86.

The student is then instructed to stretch a large elastic or other connector 22 between the pins 18. The student is then asked to read the gradation label 74 which is a degree mark. In the case of a triangle, for example, 0, 120, and 240 would be the numerical values of the gradation labels 74, which would be the specific principal angles 78 for a triangle. The student would then be asked to count the number of polygonal sides 84 in the polygon 86 which resulted.

The Latin prefixes can be introduced to the student at this point to show how polygons are named. That is, three sides are formed by three angles. Thus, the Latin "tri" describes three and angle describes angle, so a three-angle polygon is a triangle. Similarly, a square is a quadrangle, and a pentagon is a pentangle. By the same token, a triangle is a trilateral or trigon polygon. A square is a quadrilateral or quadrigon. A five-sided figure is a pentalateral or pentagon, and a six-sided figure is a hexalateral or hexagon. Students will then see that all the angular names and "lateral" names and "gon" names apply equally, although some have become more popular. That is, we call a three-sided figure a triangle while we call a five-sided figure a pentagon.

The student is next instructed to lay the protractor 26, scissor protractor 27 and divider protractor 28 over the circle 16 or any other lines of interest to measure various angles about the centroid or the origin 60 of the circle 16 to the vertices 92 of the polygon 86. The student will soon see that the angles always add up to 360°. That is, the side of any polygon 86 always subtends a fraction of the circle 16, which fraction always adds with those of the other polygonal sides 84 to a full circle 16 of 360°.

The student is next asked to compare the length of the polygonal sides 84 and finds them all to be of identical length. Thus, the student is able to determine what a regular polygon 86 is. Next, the student is asked to measure angles from vertices 92 of the polygon 86, thus measuring the interior angles 87 of the polygon 86.

By comparing all of the interior angles 87 and the polygonal sides 84, the student will see that they are each equal. Thus, the regular polygon 86 is an equilateral or equal-sided polygon. Next, the student can begin adding up all the interior angles 87 and realizing that if they all add to 360 degrees, then knowing the number of polygonal sides 84 will allow the student to deduce the third interior angle 87.

The foregoing study of a single polygon 86 was a triangle in FIG. 2. The student may change the colors of the pins 18 and create other shapes of polygons. The student is then shown why a six-sided polygon has 60° angles, for example, whereas the three-sided polygon 86 has 120° angles, measured along the circumference of circle 16.

After the student has performed the foregoing exercises with the basic polygonal shapes, the student is then requested to create a chart of rules which relate the various characteristics of the polygon 86. When charting out different polygons side-by-side, the student then can formulate the pattern in mathematical symbols which he or she has recognized in visual symbols. Thus, a triangle has three sides with three 120° angles subtended thereby and three interior angles summing to 180°. The square by contrast has four equal sides subtending 90° each and interior angles summing to 90×4 or 360°. A hexagon has six equal sides, each subtending 60° and the six interior angles add to 720°. Finally, an octagon has eight equal sides, each subtending 45° and the interior angles add to 2180°. The student can then extrapolate this information to regular polygons which are prime numbered, that is seven-sided, nine-sided, eleven-sided, thirty-seven sided.

For the student who is comfortable with the mathematical principles hereinbefore described, the protractor can be used along the polygonal side 84 of a polygon 86 to show relationships between exterior angles 88. Thus, concepts such as supplementary angles, complementary angles, and so forth can be used by the student with understanding. That is, the student can use the protractor 26, scissor protractor 27, divider protractor 28, and the straight edge 24 on the various polygonal sides 84 of the polygon 86 to show the relationship between supplementary and complementary angles, parallel lines, and so forth.

I claim:

1. An apparatus comprising:
    a surface for supporting and displaying geometric relationships;
    axes orthogonally oriented on said surface and having an origin at their point of intersection, for orienting said surface, and for dividing said surface into quadrants;

a circle on said surface, having a center, a radius and radii, a diameter, and a circumference with angular displacement therealong, said center being located at said origin, for visualizing the characteristics of said circle;

gradation points distributed equidistantly along said circumference of said circle for subdividing said angular displacement on said circle into more than 4 equal angular divisions;

pins removably attached at said gradation points for marking said gradation points along said circumference; and connectors for linearly connecting said pins, attachable therebetween for representing lines, radii, angles and shapes defined by said pins.

2. The apparatus of claim 1, wherein said pins are pegs removably attached to said surface at desired locations by means of holes formed in said surface, said holes being sized to provide a snug fit of said pegs therein.

3. The apparatus of claim 1, further comprising at least one protractor for measuring said angles between said radii of said circle.

4. The apparatus of claim 1, further comprising a compass for circumscribing arcs and for bisecting angles.

5. An apparatus comprising:

a surface for supporting and displaying geometric relationships;

axes orthogonally oriented at right angles on said surface and having an origin at their point of intersection, for orienting said surface, and for dividing said surface into quadrants;

a circle on said surface, having a center, a radius, a diameter, and a circumference with angular displacement therealong, said center being located at said origin, for visualizing the characteristics of said circle;

gradation points on said circumference of said circle for subdividing said angular displacement on said circle;

pins for marking said gradation points, removably attached to said surface and identifying angular location of points along said circumference;

connectors for linearly connecting said pins, attachable therebetween for representing lines, radii, angles and shapes defined by said pins;

labels on said surface for indicating said gradation points; and pigmentation on said surface for indicating vertices of polygons on said circumference of said circle.

6. An apparatus comprising:

a surface for supporting and displaying geometric relationships;

axes orthogonally oriented at right angles on said surface and having an origin at their point of intersection, for orienting said surface, and for dividing said surface into quadrants;

a circle on said surface, having a center, a radius, a diameter, and a circumference with angular displacement therealong, said center being located at said origin, for visualizing the characteristics of said circle;

gradation points on said circumference of said circle for subdividing said angular displacement on said circle;

push pins removably attached to said surface for marking said gradation points and identifying angular locations of points along said circumference;

connectors for linearly connecting said pins, attachable therebetween for representing lines, angles and shapes defined by said pins.

7. The apparatus of claim 6, wherein said push pins are variously pigmented to create a plurality of groups for identifying members of the group when arranged about said circumference of said circle to form vertices of a polygon.

8. A mathematical experiment kit comprising:

a box for containing all the parts of the kit;

a surface member;

a circle permanently marked on said surface member, said circle having a circumference, degrees, and origin, alternatively called its center;

pins for marking points on said surface;

connectors for connecting said marking means with lines;

graduations on said circumference of said circle corresponding to angular displacement in degrees; and geometric cartesian axes permanently marked on said surface member, having their point of intersection at said origin of said circle; and means for erasably marking on said surface member.

9. The kit of claim 8, further comprising at least one protractor for measuring said angular displacement.

10. The kit of claim 8, further comprising a compass for scribing arcs and for bisecting angles.

11. The kit of claim 8, further comprising a straight-edge for marking lines and angles on said surface member.

12. The kit of claim 8, wherein said connecting means are elastic bands for stretching around said pins, thereby connecting said pins.

13. A mathematical experiment kit comprising:

a box for containing all the parts of the kit;

a surface member;

a circle permanently marked on said surface member, said circle having a circumference, degrees, and origin, alternatively called its center;

pins for marking points on said surface;

connectors for connecting said marking means with lines;

graduations on said circumference of said circle corresponding to angular displacement in degrees; and geometric cartesian axes permanently marked on said surface member, having their point of intersection at said origin of said circle;

labels applied to said surface member indicating principal points on said circle;

groups of said principal points corresponding to vertices of regular polygons circumscribed by said circle;

pigments applied to said vertices of said polygons which can be inscribed within said circle.

14. The kit of claim 13, further comprising at least one protractor for measuring said angular displacement.

15. The kit of claim 13, further comprising a compass for scribing arcs and for bisecting angles.

16. The kit of claim 13, further comprising a straight edge for marking lines and angles on said surface member.

17. The kit of claim 13, further comprising means for erasably marking on said surface member.

18. The kit of claim 13, wherein said connectors are elastic bands for stretching around said pins, thereby connecting said pins.

19. For an apparatus comprising:
   a surface for supporting and displaying geometric relationships;
   axes orthogonally oriented at right angles on said surface and having an origin at their point of intersection, for orienting said surface, and for dividing said surface into quadrants;
   a circle on said surface, having a center, a radius, a diameter, and a circumference with angular displacement therealong, said center being located at said origin, for visualizing the characteristics of said circle;
   gradation points on said circumference of said circle for subdividing said angular displacement on said circle;
   pins for marking said gradation points, removably attached to said surface and identifying angular location of points along said circumference;
   connectors for linearly connecting said pins, attachable therebetween for representing lines, angles and shapes defined by said pins,
a method for said apparatus, said method comprising:
   defining a circle as a set of points equidistant from a center point;
   demonstrating said circle on said surface;
   dividing said circle into degrees;
   defining an angle as the relation between two radially-oriented liens passing through said center;
   demonstrating that said gradation points marked on said circle correspond to angular measurements;
   demonstrating independence of said angular displacement and said diameter;
   defining said radius, diameter, and circumference;
   defining common angles including right angle, straight angle, acute angle, obtuse angle, complementary angle, and supplementary angle;
   demonstrating each fundamental concept and relationship of circles and angles on said circle on said surface.

20. The method of claim 19, further comprising:
   the step of finding a selected number of equidistant point on said circle;
   marking said equidistant points;
   connecting said equidistant points.

21. The method of claim 19, further comprising the steps of:
   providing individual demonstration surfaces to students;
   providing a larger, more visible version of said surface to an instructor;
   demonstrating each principle on said surface used by said instructor;
   requesting each student to demonstrate each principle on said surfaces provided to students;
   eliciting students' observations on the form of rules defining and relating geometric shapes, angles and points.

* * * * *

UNITED STATES PATENT AND TRADEMARK OFFICE
CERTIFICATE OF CORRECTION

PATENT NO. : 5,215,467

DATED : June 1, 1993

INVENTOR(S) : Donald A. Brischke

It is certified that error appears in the above-indentified patent and that said Letters Patent is hereby corrected as shown below:

In Column 1, line 36, after "shapes" insert --are--;

In Column 4, line 41, change "18" to --10--;

In Column 5, line 1, "TM" should be superscript;

In Column 5, line 7, "TM" should be superscript;

In Column 5, line 9, change "Celote TM" to --Celotex™--;

In Column 8, line 14, change "scissors" to --scissor--;

In Column 13, line 28, after "for" insert --using--;

In Column 14, line 2, change "liens" to --lines--;

In Column 14, line 16, change "point" to --points--;

Signed and Sealed this

Twenty-second Day of March, 1994

Attest:

BRUCE LEHMAN

*Attesting Officer*  *Commissioner of Patents and Trademarks*